United States Patent Office 3,226,368
Patented Dec. 28, 1965

3,226,368
PROCESS OF PREPARING POLYESTERURE-
THANES CONTAINING CARBODIIMIDE
GROUPS
Artur Reischl, Leverkusen, and Hans Holtschmidt and
Peter Fischer, Cologne-Stammheim, Germany, assignors to Farbenfabriken Bayer Aktiengesellschaft, Leverkusen, Germany, a German corporation
No Drawing. Filed Feb. 23, 1962, Ser. No. 175,276
Claims priority, application Germany, Feb. 27, 1961,
F 33,297
6 Claims. (Cl. 260—75)

This invention relates to polyesterurethanes and more particularly to polyesterurethanes stable against hydrolytic degradation.

It has been heretofore known to incorporate into polyester plastics certain carbodiimide-containing compounds to stabilize the polyester against hydrolytic degradation. However, such stabilizing techniques suffer the disadvantage that many times the carbodiimides contain traces of metal hydroxides or tertiary amines remaining from their preparation and thus when attempts are made to react the polyesters with polyisocyanates to produce polyurethanes, accelerated reactions occur which are difficult to control. This is particularly undesirable in casting techniques where the working life of polyurethanes is already of short duration. The above-described technique of stabilizing polyesters is also disadvantageous for the reason that polycarbodiimides containing a plurality of polycarbodiimide groups are many times insoluble in the polyesters and monocarbodiimides show a tendency to migrate under the influence of temperature and solvents. Further, many carbodiimides recrystallize from the plastic, thereby preventing the stabilization effect from taking place.

It is also known that carbodiimide polymers can be formed by reacting an hydroxyl terminated active hydrogen containing compound with a polyisocyanate to produce an —NCO terminated prepolymer and then diluting this prepolymer with a solvent containing a catalyst which promotes the formation of carbodiimide groups. While reaction products prepared in this manner exhibit good physical properties, the carbodiimide linkages which are separated by long chain high molecular weight polyesterurethane residues do not provide a stabilizing effect on the ester groups because of the distance apart at which they occur and the small number present in comparison to the frequently repeating ester groups.

It is, therefore, an object of this invention to provide polyesterurethanes stabilized against hydrolytic degradation. It is still another object of this invention to provide a method of preparing stable polyesterurethanes. It is still another object of this invention to provide polyesterurethanes stable against hydrolytic degradation by the incorporation into the molecular structure of a large number of carbodiimide groups.

The foregoing objects and others which will become apparent from the following description, are accomplished in accordance with the invention, generally speaking, by providing polyesterurethanes containing a large number of carbodiimide groups by simultaneously reacting an hydroxyl terminated polyester prepared by reacting a polyhydric alcohol and a polycarboxylic acid with an excess of an organic polyisocyanate in the presence of a catalyst which promotes the formation of carbodiimide groups. Thus, it can be seen that the reaction of the —NCO groups of the organic polyisocyanate with other —NCO groups to form carbodiimide groups and with hydroxyl groups of the polyester to form urethane linkages will occur simultaneously since it has been found that these two reactions in the presence of carbodiimide-group-promoting catalysts will occur competitively. By this technique, a large number of carbodiimide groups are included in the molecular structure of the polyesterurethane, thus enabling the stabilization action due to the carbodiimide group to take effect without the disadvantages enumerated above where carbodiimide compounds are merely mixed with polyester compositions without the reaction between the two taking place.

While the reaction in accordance with this invention can be conducted at any suitable temperature, the formation of carbodiimide groups is considerably increased by increasing the temperature of the reaction. It is, therefore, preferred that the reaction be conducted at a temperature of from about 50 to about 200° C., preferably from about 80 to about 150° C.

In the process in accordance with this invention, any suitable hydroxyl terminated polyester may be used such as, for example, those prepared by reacting a polyhydric alcohol with a polycarboxylic acid. Any suitable polyhydric alcohol may be used in the reaction with a polycarboxylic acid to form a polyester such as, for example, ethylene glycol, propylene glycol, hexane diol, diethylene glycol, hexane triol, glycerine, trimethylol propane, trimethylol ethane, bis-(hydroxy methyl cyclohexane), pentaerythritol, sorbitol, polyethylene glycols, polypropylene glycols and the like. Any suitable carboxylic acid may be used such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid and the like.

Any suitable organic polyisocyanate may be utilized in the process of this invention to react with the hydroxyl polyester and to co-react to form carbodiimide groups such as, for example, aliphatic polyisocyanates, aromatic polyisocyanates, alicyclic polyisocyanates and heterocyclic polyisocyanates including such as, for example, ethylene diisocyanate, ethylidene diisocyanate, propylene diisocyanate, butylene diisocyanate, cyclopentylene-1,3-diisocyanate, 2,4-tolylene diisocyanate, 2,6-tolylene diisocyanate, 4,4'-diphenylmethane diisocyanate, 2,2-diphenylpropane - 4,4' - diisocyanate, p-phenylene diisocyanate, m-phenylene diisocyanate, xylylene diisocyannate, 1,4-naphthylene diisocyanate, 1,5-naphthylene diisocyanate, diphenyl-4,4'-diisocyanate, azobenzene-4,4'-diisocyanate, diphenyl-sulfone-4,4' - diisocyanate, dichlorohexamethylene diisocyanate, tetramethylene diisocyanate, pentamethylene diisocyanate, hexamethylene diisocyanate, furfurylidene diisocyanate, 1 - chlorobenzene - 2,4 - diisocyanate, 4,4',4''-triisocyanato triphenyl methane, 1,3,5-triisocyanato benzene, 2,4,6-triisocyanato toluene, 4,4'-dimethyl diphenyl methane-2,2',5,5'-tetraisocyanate and the like. It is, of course, necessary that the isocyanate be used in excess over that required to react with the active hydrogen atoms present. It is preferred that the isocyanate be present in an amount of from about 1¼ to about 5 times the amount necessary to react with the active hydrogen atoms of the polyester.

In the process of this invention any suitable catalyst which will promote the formation of carbodiimide groups by reaction of isocyanate groups may be used including phosphorous-containing compounds such as, for example, triphenylphosphine, tributylphosphine, 1-phenyl-3-methyl-1-phospha-cyclopent-3-ene or the corresponding cyclopentane, 1-ethyl-3-methyl-phospha-cyclopentane, 1-ethyl-phospha-cyclopentane or the 1-phenyl-derivative, as well as the P-oxides of such compounds; 1-phenyl-3-phospholine, 3-methyl-1-phenyl-3-phospholine, 1-ethyl-3-phospholine, 3-isopropyl-1-phenyl-3-phospholine, 3-(4-methyl-3-pentenyl)-1-phenyl-3-phospholine. The phospholine oxides and sulfides which are useful in the process of the present invention are compounds having the formula

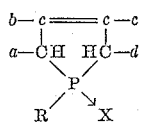

wherein $a$, $b$, $c$ and $d$ represent a radical selected from the group consisting of hydrogen, halogen, lower alkyl, lower alkenyl, phenyl, cyclohexyl, and polymethylene groups which, together with two adjacent carbon atoms in the heterocyclic ring, form a cycloaliphatic ring; R is a radical selected from the group consisting of lower alkyl and phenyl radicals; and X is a chalcogen having an atomic weight of from 15 to 33. It is to be understood that the R phenyl radicals may contain inert substituents such as alkyl or halogen radicals. Representative compounds include 1-phenyl-3-phospholine 1-oxide, 3-methyl-1-phenyl-3-phospholine 1 - oxide, 1-phenyl-3-phospholine -1-sulfide, 1-ethyl-3-phospholine 1-oxide, 1-ethyl-3-methyl-3-phospholine 1-oxide, 1-ethyl - 3 - methyl-3-phospholine .1-sulfide, 2-phenylisophosphindoline 2-oxide, 1-ethylphenyl-3-methyl-3-phospholine 1-oxide, 3-(4-methyl-3-pentenyl)-1-phenyl-3-phospholine 1-oxide, 3-chloro-1-phenyl-3-phospholine 1-oxide, 1,3-diphenyl-3-phospholine 1-oxide, and the like.

Phospholidines may also be used in the process of the present invention such as compounds having the formula

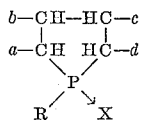

wherein $a$, $b$, $c$, $d$, R and X have the significance defined above. Representative phospholidines include 1-phenylphospholidine 1-oxide, 1-ethyl-3-methylphospholidine 1-oxide, 1-phenylphospholidine, 3-methyl - 1 - phenyl-phospholidine, 1-ethyl - 3 - methylphospholidine, 1-ethyl-phospholidine and the like. These phospholine and phospholidine compounds are described in U.S. Patents 2,663,736 through 2,663,739 and 2,853,473. It is preferred that the phosphorous compounds which especially catalyze only on carbodiimide formation from isocyanates be used. It is preferred that the catalyst be used in an amount less than 5% by weight and preferably in an amount of from about 0.0001 to about 5% by weight. Best results are obtained by using cyclic phosphorous oxides for example, 1-phenyl-3-methyl-1-phospha-cyclopent-3-ene-P-oxide in quantities of from about 0.001 to about 0.01% by weight based on the reaction mixture. The catalyst which promotes the formation of carbodiimide groups can be added either before or after the polyisocyanate, however, for better proportioning of the catalytically active quantities, it is preferred that the catalyst be dissolved in 10 to 100 times the quantity by weight of the polyester to be used.

It may be desirable to include a chain extending agent or cross linking agent along with or subsequent to the reaction of the isocyanate groups with the hydroxyl groups of the polyester to form polycarbodiimide containing polyesterurethanes. Any suitable chain extending agent may be used such as, for example, water, hydrazine, 1,3-butanediol, 1,4-butanediol, decanediol, hexanediol, thiodiglycol, 1,4 - phenylene - (bis - hydroxy ethyl ether), ethylene glycol, propylene glycol, bis(hydroxy methyl cyclohexane) trimethylol propane, pentaerythritol, ethylene diamine, propylene diamine, hexamethylene diamine, cyclohexylene diamine, phenylene diamine, tolylene diamine, 3,3'-dichlorobenzidine, 3,3'-dinitrobenzidine, hydrazine, triaminobenzene, aminoethyl alcohol, amino propyl alcohol, amino butyl alcohol and the like.

Of course, the products prepared in accordance herewith may be used in the formation of final products including elastomeric homogeneous or porous materials, coating compositions or even intermediate products which can be stored and subsequently fabricated by the addition of a cross linking agent or merely by the application of heat and pressure. The porous materials prepared using the compositions prepared in accordance with this invention of course find use as insulating materials for both sound and heat, cushioning materials in the upholstering industry, crash pads for automobiles and the like. The elastomeric homogeneous materials are useful in the manufacture of heel lifts, gears, valve seats and the like. The compositions can also be dissolved in suitable solvents and utilized in the coating industry particularly where a high degree of stability against hydrolysis is required.

The invention will be further illustrated by the following examples in which parts are by weight unless otherwise specified.

*Example 1*

About 200 parts of a polyester of ethylene glycol and adipic acid having an hydroxyl number of about 56 and an acid number of about 1 are heated for about 30 minutes to a temperature of from about 130 to about 140° C. at 12 mm. Hg. while stirring.

Without further heating, about 38 parts of naphthylene-1,5-diisocyanate are added under atmospheric pressure and, after it has dissolved, about 4 parts of triphenyl phosphine oxide are added. After a total period of about 12 minutes, about 4 parts of butane-1,4-diol are incorporated by stirring into the melt, which is at a temperature of from about 125 to 130° C. and the reaction product is poured into hot molds. In order to complete the reaction, final heating takes place in the open for about 24 hours at a temperature of from about 100 to about 110° C.

*Example 2*

Instead of triphenylphosphine oxide, about 0.002 part of 1-phenyl-3-methyl - 1 - phospha-cyclopent-3-P-oxide in about 2 parts of ethylene glycol-adipic acid polyester are added while stirring. In other respects, the reaction is as indicated in Example 1.

*Example 3*

About 200 parts of glycol-adipic acid polyester, about 62 parts of naphthylene-1,5-diisocyanate, about 0.002 part of 1-phenyl-3-methyl - 1 - phospha-cyclopent-3-P-oxide in about 2 parts of polyester and about 14 parts of butane-1,4-diol are reacted as indicated in Example 1.

*Example 4*

100 g. of a polyester prepared from 1 mol of adipic acid and 1.1 mol of diethylene glycol (OH number 56; acid number 1) are mixed with 1 part of dimethylbenzylamine, 2 parts of a non-ionic emulsifier prepared from diphenyl oxide and ethylene oxide (50% water), 1 part of sodium castor oil sulphate (50% water), 1 part of water, 0.5 part of polydimethylsiloxane and 3 parts of triphenylphosphine oxide. After addition of 35 parts of toluylene diisocyanate (2,4 and 2,6 isomers; 65 to 35) the mixture starts to foam and yields a foam with the physical properties listed under A.

The experiment is then repeated, but without the addition of triphenylphosphine oxide. An elastic foam is obtained with the physical properties listed under B.

|  | A | B |
|---|---|---|
| Bulk density, kg./m.$^3$ | 54 | 51 |
| Tensile strength, kg./cm.$^2$ | 1.6 | 1.4 |
| Breaking elongation, percent | 175 | 165 |
| Compression set (at 40% compression), g./cm.$^2$ | 83 | 77 |

The compression set is decreased after ageing for 5 days at 90° C. and 95% relative moisture:

40%  55%

The properties of the products prepared in accordance with the three examples are illustrated in the following table which compares the properties of the products after formation thereof and then again after 14 days of ageing at 70° C. and 95% air humidity with the properties of products prepared in the same manner as the examples without the addition of the catalyst which promotes the formation of carbodiimide groups simultaneously with the formation of urethane groups by the reaction of isocyanate groups with hydroxyl groups of the polyester. From this table it can be readily seen that products prepared in accordance with this invention show remarkable improvement with respect to hydrolysis resistance over those prepared in the customary manner.

TABLE

| Days of Ageing [1] | A | | B | | C | | D | | E | | F | |
|---|---|---|---|---|---|---|---|---|---|---|---|---|
| | 0 | 14 | 0 | 14 | 0 | 14 | 0 | 14 | 0 | 14 | 0 | 14 |
| Example 1 | 322 | 200 | 500 | 625 | 3 | 26 | 43 | 20 | 82 | 72 | 45 | 42 |
| Example 2 | 336 | 240 | 550 | 675 | 3 | 22 | 46 | 30 | 81 | 76 | 46 | 42 |
| Comparison product re Examples 1 and 2 without catalyst | 228 | 40 | 640 | 90 | 9 | 20 | 40 | 20 | 78 | 79 | 51 | 38 |
| Example 3 | 344 | 260 | 475 | 550 | 15 | 35 | 51 | 38 | 94 | 72 | 43 | 38 |
| Comparison product re Example 3, without catalyst | 270 | 74 | 630 | 50 | 45 | 4 | 70 | 29 | 94 | 95 | 45 | 36 |

[1] Ageing conditions: 70° C./95% air humidity.
A = Tensile strength DIN 53504 (kg./cm.$^2$).
B = Breaking elongation (percent).
C = Elongation 1 minute after tearing (percent).
D = Ring strength test (kg./abs.).
E = Shore hardness A DIN 53505.
F = Elasticity DIN 53512 (percent).

It is of course to be understood that any of the hydroxyl polyesters, organic polyisocyanates, chain extending agents or carbodiimide promoting catalysts may be substituted throughout the working examples for the particular compounds utilized therein.

Although the invention has been described in considerable detail for the purpose of illustration, it is to be understood that variations can be made by those skilled in the art without departing from the spirit of the invention and scope of the claims.

What is claimed is:

1. A method for preparing polyesterurethanes which comprises reacting in the presence of a phosphorous containing catalyst which promotes the formation of carbodiimide groups by reaction of NCO groups an excess of an organic polyisocyanate with an hydroxyl terminated polyester prepared by the process which comprises reacting a polyhydric alcohol with a polycarboxylic acid.

2. In the process of forming polyurethane plastics which comprises reacting an excess of an organic polyisocyanate with an hydroxyl polyester prepared by the process which comprises reacting a polyhydric alcohol with a polycarboxylic acid, the improvement which comprises conducting said polyisocyanatehydroxyl polyester reaction in the presence of a phosphorous containing catalyst which promotes the formation of carbodiimide groups by reaction of NCO groups.

3. A method for preparing polyesterurethanes which comprises reacting in the presence of a phosphorous containing catalyst which promotes the formation of carbodiimide groups by reaction of NCO groups an excess of an organic polyisocyanate with an hydroxyl terminated polyester prepared by the process which comprises reacting a polyhydric alcohol with a polycarboxylic acid and reacting the product prepared thereby with a chain extending agent selected from the group consisting of water, hydrazine, and an organic compound containing active hydrogen atoms selected from the group consisting of hydroxyl and amino groups.

4. A method for preparing polyesterurethanes which comprises reacting in the presence of a phosphorous containing catalyst which promotes the formation of carbodiimide groups by reaction of NCO groups and at a temperature of from about 50 to about 200° C. an excess of an organic polyisocyanate with an hydroxyl terminated polyester prepared by the process which comprises reacting a polyhydric alcohol with a polycarboxylic acid.

5. In the process of forming polyurethane plastics which comprises reacting an axcess of an organic polyisocyanate with an hydroxyl polyester prepared by the process which comprises reacting a polyhydric alcohol with a polycarboxylic acid, the improvement which comprises conducting said polyisocyanatehydroxyl polyester reaction at a temperature of from about 50 to about 200° C. in the presence of a phosphorous containing catalyst which promotes the formation of carbodiimide groups by reaction of NCO groups.

6. A method for preparing polyesterurethanes which comprises reacting in the presence of from about 0.001 to about 0.01% by weight of 1-phenyl-3-methyl-1-phospha-cyclopent-3,-ene-P-oxide an excess of an organic polyisocyanate with an hydroxyl terminated polyester prepared by the process which comprises reacting a polyhydric alcohol with a polycarboxylic acid.

References Cited by the Examiner

UNITED STATES PATENTS 2,941,966   6/1960   Campbell _____ 260—77.5
2,941,983   6/1960   Smeltz _____ 260—77.5

FOREIGN PATENTS 589,937   12/1959   Canada.

LEON J. BERCOVITZ, *Primary Examiner.*

J. R. LIBERMAN, *Examiner.*